March 28, 1933. C. E. HENRIOD 1,903,044
POWER TRANSMISSION MECHANISM
Filed Feb. 4, 1931 3 Sheets-Sheet 1

C. E. Henriod
INVENTOR
By: Marks &Clerk
Attys.

March 28, 1933.  C. E. HENRIOD  1,903,044
POWER TRANSMISSION MECHANISM
Filed Feb. 4, 1931  3 Sheets-Sheet 2
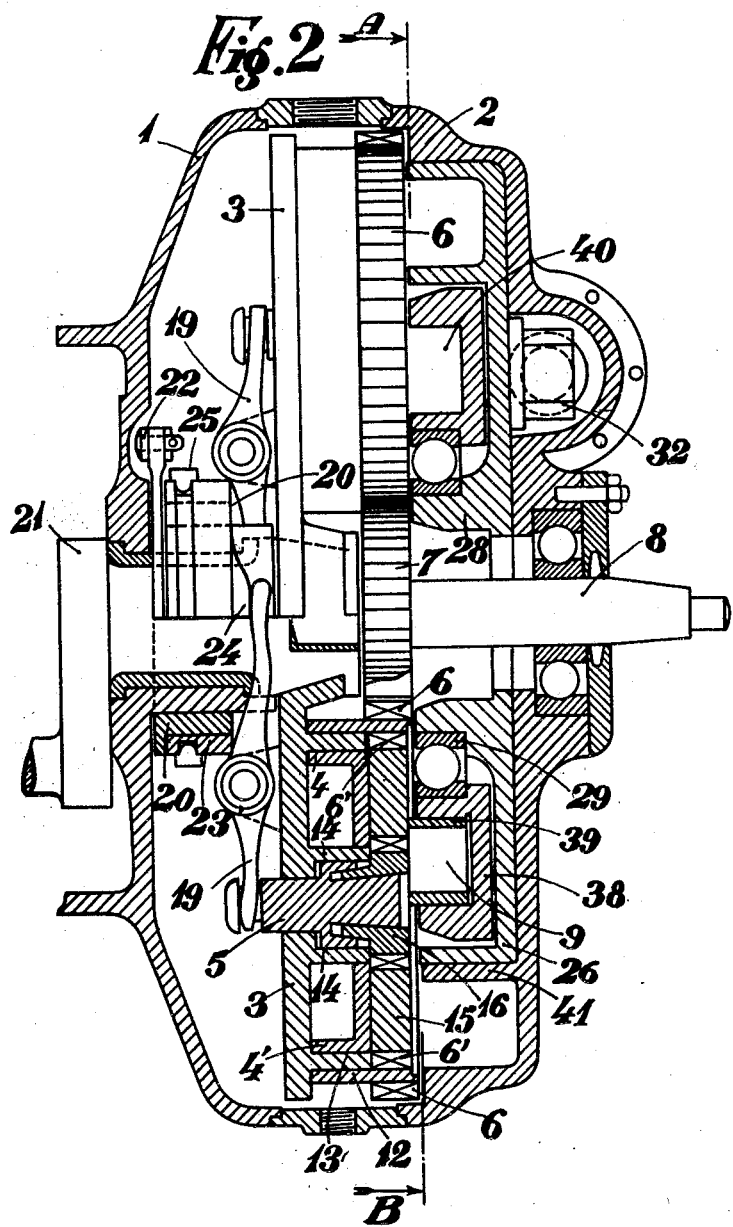
INVENTOR:
C. E. Henriod
BY: Marks &Clerk
ATTORNEYS.

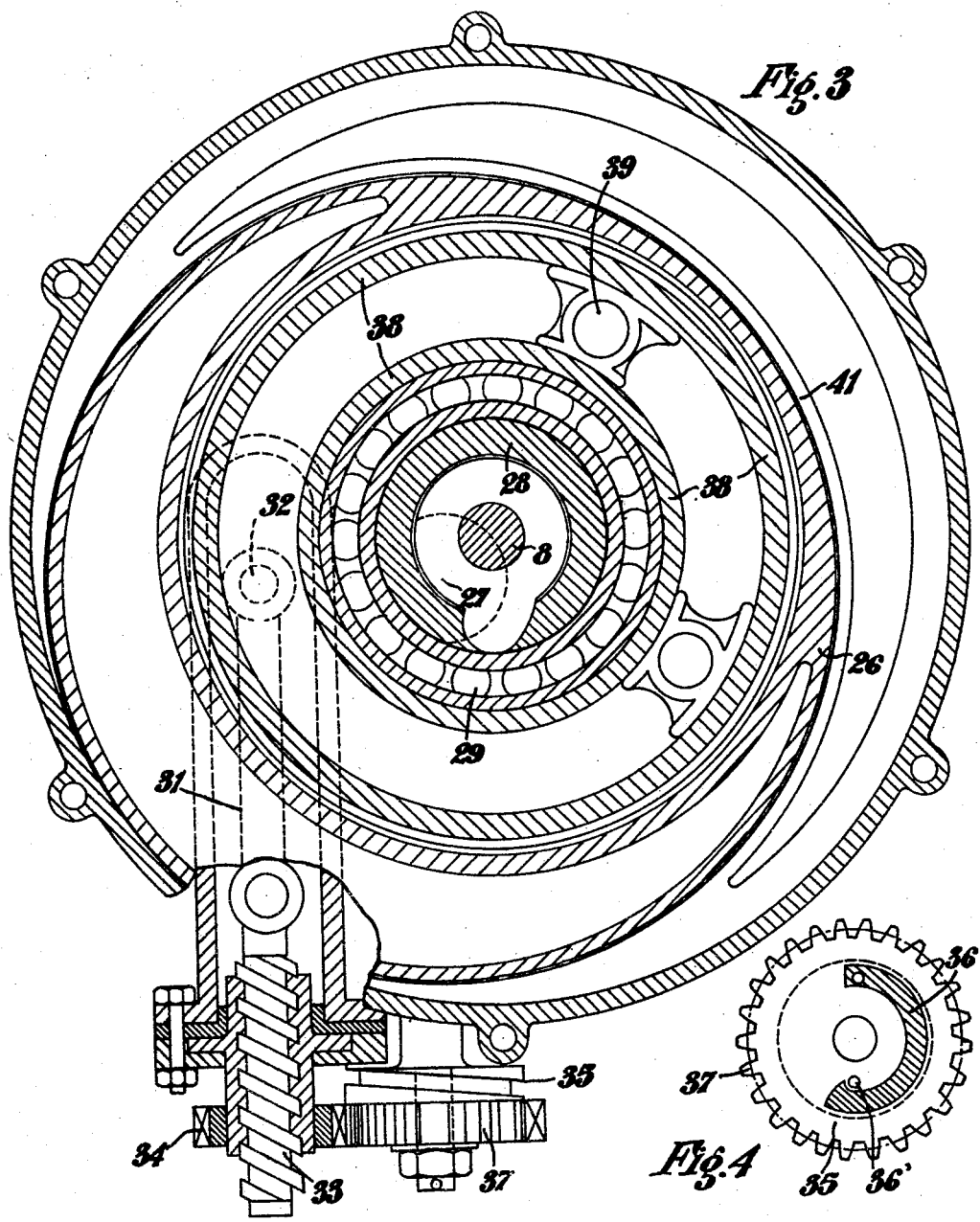

Patented Mar. 28, 1933

1,903,044

UNITED STATES PATENT OFFICE

CHARLES EDOUARD HENRIOD, OF AREUSE, SWITZERLAND

POWER TRANSMISSION MECHANISM

Application filed February 4, 1931, Serial No. 513,411, and in France February 17, 1930.

The present invention relates to a power transmission mechanism connecting a driving shaft to a driven shaft and consisting of the type which I have already described in my French Patent No. 519.496 of April 29, 1919, with seven additions and particularly in the fifth addition dated March 5, 1921, showing power transmission mechanism mounted on the flywheel of a motor.

The object of the present invention is to provide a power transmission mechanism of the above mentioned type in which the ratio of speed between the driving and the driven shafts can be continuously varied by means of a single operating shaft.

An embodiment of the invention is illustrated in the accompanying drawings in which, Figure 1 is a plan view, partly drawn in section, of a power transmission mechanism mounted on the flywheel of a motor.

Figure 2 is an axial section through the mechanism.

Figure 3 is a section along the line A—B of Fig. 2 and showing the operating means for the mechanism.

Figure 4 shows a detail part.

Figure 1:
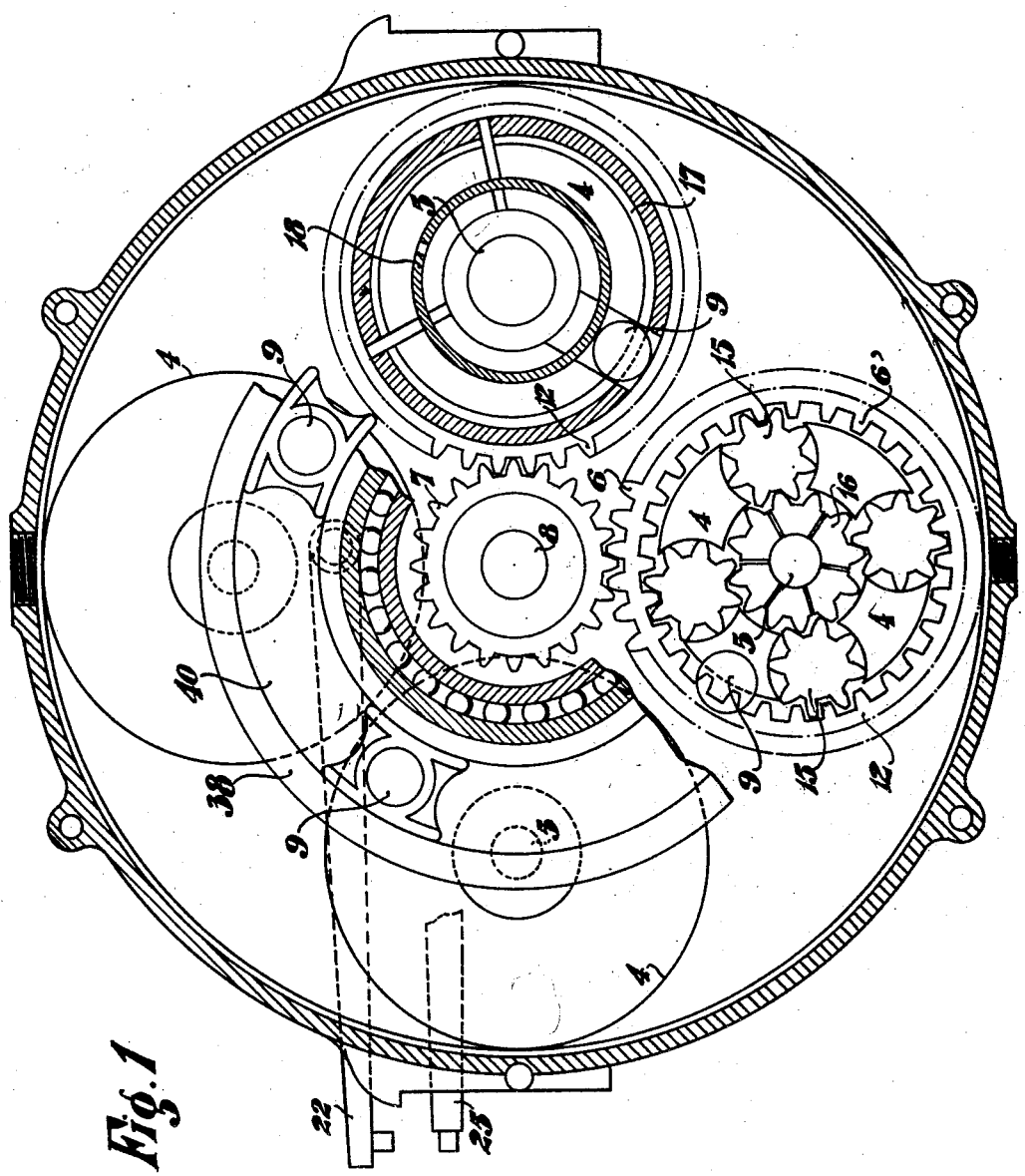

1 and 2 indicate the two parts of the casing in which the mechanism is enclosed, 3 is the flywheel of the motor, 21 the crankshaft and 8 the driven shaft to which is secured the pinion 7. The flywheel 3 is provided with circular guides 13 having the shape of rings and being situated between the axis of the flywheel and its periphery and raised out of the material of the flywheel proper. The exterior surface of each guide 13 carries a crown 12 which is provided with an internal and an external gear 6 and 6'. Within the guides 13 are disposed plates 4 fitting with their walls 4' into the rings 13. On these plates 4 are rotatably mounted satellite pinions 15. In the example shown the pinions are guided in cavities (Fig. 1) formed in the discs and in which they fit with their periphery. A crank pin 9 is secured to each of the discs 4 and suitably cut in order that the internal gear 6' of the crown 12 can pass below the cylindrical part of the pin. Hubs 14 are raised out of the flywheel 3 coaxially to the guides 13 and are provided with openings for the passage of shafts 5 loosely mounted on the flywheel. These shafts have a conical portion which is destined to cooperate with the hub of an extensible pinion 16 formed by a plurality of identical segments. A disc 4 provided with satellites meshing with an extensible pinion and an internally geared crown constitutes a coupling mechanism which I have already utilized for other purposes. It permits to couple, by axial displacement of the shaft 5, the disc 4 with the crown 12, owing to the fact that the extension of the pinion 16 renders impossible the transmission of movement by the meshing gears since the meshing relation is not correct.

Another method of coupling, as a modification, is illustrated on the right hand side of the Figure 1. There are shown three brake shoes 17 in the interior of the crown 12. This latter has in this case no internal gear but a smooth surface against which the brakes can be applied. 18 indicates an annular split spring tending to move the brake shoes towards the center, this spring being disposed in a groove of the brake shoes.

It will be understood that the brakes could also be operated by means of an axially movable conical shaft.

The conical shafts 5 may be operated by means of levers 19 mounted on the flywheel 3 and actuated by a cam 24 provided on a ring 20 and having attaching means 22 for an operating member. A ring 23 can slide on the ring 20 and is actuated by means of a fork 25. This fork 25 and the attaching member 22 are each connected to the operating screw 33 by suitable connections which are not represented.

In Fig. 2 a crank pin 9 has been shown for purposes of illustration though in Fig. 1 no such pin is situated in the axial plane of section. This pin 9 is guided in a sleeve 39 which is freely inserted in a circular recess 40 provided in a ring 38. This ring 38 is guided by means of a ball bearing 29 on the hub 28 of a disc 26. This hub is eccentrically disposed relative to the axis 27 of the disc 26 for an amount equal to that of which the axis 27 is eccentric relative to the common axis of the shafts 8 and 21.

The circular disc 26 is movable around its axis 27 and is guided with its periphery in a circular rim 41 with the eccentric axis 27, provided in the part 2 of the casing.

The movement of the disc 26 in its fixed guide is determined by a controlling screw 33 connected by means of a rod 31 to a pin 32 secured to the disc 26. 37 and 35 are members of the mechanical connection between the controlling shaft and the cam rings 20 and 23. The connection members comprise also a wheel 37 provided on its face with a groove 36 and a pin 36'.

The operation of the described mechanism is the following:

The ring 20 is maintained in an unchanged position relative to the flywheel when the control member 33 does not act upon the connecting point 22. This control member can change the angular position of the ring 20 and the axial position of the ring 20 on the ring 23. For this reason the lever 22 has its outer end abutting in radial direction against the spiral surface 35, while the end of the lever 25 is engaged in the helicoidal groove 36 of the wheel 37. The cam surface 24 of the ring 20 is constructed in such a manner that the lever 19 is actuated towards the disc 3 once during one revolution of the ring. When it is so actuated a traction is exerted on the shaft 5 which results in an extension of the pinion 16 and therefore in a rigid connection of the discs 4 with the crown 12. This connection is always made for one of the four coupling groups only, during the time that the cam 24 passes by one of the levers 19. When one of the crowns 12 is made rigid with its corresponding disc 4, this coupling group constitutes a planetary gear of which the axis is driven by the flywheel 3 but which stays mobile relative to the guide 13.

However, the disc 4 and the crown 12 cannot turn when the pin 9 is engaged in the groove 40 and when this latter is centered, because disc and crown are then held at an unalterable distance from the axis of the shafts 8 and 21. The reaction of the shaft 8 gives the tendency to produce a rotation of the crown 12 about its axis and in the same direction as the rotation of the flywheel and consequently of the disc 4 carrying the pins 9. Owing to this tendency of rotation it results that the pin 9 exerts, by means of its sleeve 39, a radial pressure upon one of the two walls of the groove 40, causing the ring 38 to turn on its ball bearing by the effect of virtual friction created by the pressure between the sleeve 39 and the wall of the groove 40. The moment which tends to rotate the crown 12 being thus balanced by the radial reaction of the ring 38, the same effect is obtained as if the crown 12 would be fixed to the flywheel. This crown drives therefore the pinion 7 without rolling on it, by which direct drive is obtained between the driving and driven shafts. This direct drive would last only over a quarter of a revolution for each coupling group of discs and crowns, as these groups relieve each other at each quarter of a revolution, if an adjustment would not be provided to the effect that, when the groove 40 is centered, the ring 23 is made to slide axially in order to replace the cam 24 in its action on the levers 19 and to maintain all levers in the position in which they act on the four shafts 5 to produce the direct drive. It would be useless evidently, to constantly operate the four couplings which are provided mainly to change the speed as will be described now.

As soon as an eccentricity of the groove 40 is created by means of the central screw 33 and the rod 39, the not illustrated connections between the mechanism 35, 37 and the fork 25 make that the ring 23 is pulled back to leave the cam 24 act upon the levers 19. The cam determines the engagement of the discs 4 with the crowns 12 each quarter of revolution if there are provided, as in the example illustrated, four identical coupling mechanisms on the flywheel, or each sixth of a revolution if there would be provided six such mechanisms.

It will be understood that the ring 38, while keeping a given eccentricity relative to the main axis, can continue to turn on its ball bearing, which rotation has no other purpose than to decrease the friction work. The eccentricity creates an unavoidable small sliding movement of the sleeves 39 in the groove 40. This is not prejudicial to the purpose of the groove which is to produce an oscillating movement of the pins 9; in fact, the instantaneous positions of their respective centers are at the intersections of the circular trajectories, which are imposed to these centers by the shafts 5, with the eccentric circumferential median line of the groove 40. The centers of the pins 9 are therefore obliged to approach the axis 8 and to withdraw therefrom in their movement around this axis, so that their movement of rotation around the axis 8 is accompanied by an oscillation around the axis 5. This movement of rotation can be substantially sinuous for a suitable diameter of the groove 40.

The cam 24 is constructed in such a manner that it renders rigid each ground of discs 4 and crowns 12 while its pin 9 effects that quarter of oscillation during which its speed around the axis 5 is the most constant.

It follows from this that a certain movement of proper rotation is given to each crown 12 during the time where it acts on the pinion 7. It will be understood that according to the direction of this rotation the speed of the pinion 7 can be smaller or greater than that of the flywheel.

In order to obtain the intermediary speeds which are for instance required in an automobile, that part of the oscillation is chosen in which the pin 9 moves in the direction which gives a reduction. This is the case when the crown 12 turns in the same direction as the flywheel. It is evident that to a given eccentricity corresponds a certain amplitude of oscillatory movement and that the proper rotation of the crown about itself in the course of a like fraction of oscillation depends directly on this amplitude. When the eccentricity increases it can happen that the proper rotation of the crowns annuls completely any driving rotation of the planetary movement, so that the shaft 8 is immobile. When the eccentricity is still increased, the action due to the proper rotation of the crowns gains over the planetary driving rotation, so that the pinion 7 obtains a speed in opposite direction of that of the flywheel. This constitutes backward drive.

Since the screw 33 can be operated little by little, the ratio of speeds can be continuously varied from a negative value to the positive value of the direct drive.

It has to be observed that in its movement of eccentration the axis of the hub 28 and of the groove 40 describes a circular trajectory about the axis 27. The chord of the arc described on this trajectory and which determines the eccentricity changes the direction. It follows that the azimuth for which the cam 24 has to enter in action must vary with the eccentricity. For this reason a connection is provided between the attaching point 22 and the control member 33 in order to vary the angular position of the cam relative to the casing, to utilize always the most advantageous part of the oscillation.

When the mechanism comprises four pins 9, the speed of the crowns on a quarter of revolution varies only from 0,707 V to V, if V is the maximum speed. The number of pins can be greater whereby a smaller variation of speed is obtained.

I claim:

1. In a progressive change speed mechanism, the combination of a drive shaft, a flywheel on the drive shaft and having one face provided with a series of rings, a driven shaft in axial alignment with the drive shaft and carrying a sun wheel, a planetary wheel mounted on each of said rings on the flywheel and being guided in rotation by the exterior surface of the ring, a disc carrying a crank pin mounted and guided in rotation in the interior of each of said rings, a member slidable in parallel direction to the axis of said shafts in the center of each planetary wheel and disc and extending through the flywheel, a lever for each slidable member oscillatably mounted on the flywheel and operatively connected to said slidable member, means acted upon by each said sliding member for locking each said planetary wheel to each said disc provided with the crank pin, a disc movable about an axis parallel to the axis of said shafts, an operating shaft connected to said disc, a ring movable on said disc and forming an annular passage way engaging the crank pin of the disc mounted in the interior of each of said rings on the flywheel, a cam arranged to coact with said levers and rotatable around the central axis of the flywheel, means for operatively connecting the cam with the operating shaft, an axially movable cam adapted to act on said lever, and means for operatively connecting said second mentioned cam to the operating shaft.

2. In a progressive change speed mechanism, the combination of a drive shaft, a flywheel on the drive shaft and having one face provided with a series of rings, a driven shaft in axial alignment with the drive shaft and carrying a sun wheel, a planetary wheel mounted on each of said rings on the flywheel and being guided in rotation by the exterior surface of the ring, a disc carrying a crank pin mounted and guided in rotation in the interior of each of said rings, a member slidable in parallel direction to the axis of said shafts in the center of each planetary wheel and disc and extending through the flywheel, a lever for each slidable member oscillatably mounted on the flywheel and operatively connected to said slidable member, an internal gear on each of said planetary wheels, a clutch mechanism coacting with each planetary wheel and including an extensible pinion adapted to connect said slidable member to said internal gear, a disc movable about an axis parallel to the axis of said shafts, an operating shaft connected to said disc, a ring movable on said disc and forming an annular passage way engaging the crank pin of the disc mounted in the interior of each of said rings on the flywheel, a cam arranged to coact with said levers and rotatable around the central axis of the flywheel, means for operatively connecting the cam with the operating shaft, an axially movable cam adapted to act on said lever, and means for operatively connecting said second mentioned cam to the operating shaft.

3. In a progressive change speed mechanism, the combination of a drive shaft, a flywheel on the drive shaft and having one face provided with a series of rings, a driven shaft in axial alignment with the drive shaft and carrying a sun wheel, a planetary wheel mounted on each of said rings on the flywheel and being guided in rotation by the exterior surface of the ring, a disc carrying a crank pin mounted and guided in rotation in the interior of each of said rings, a member slidable in parallel direction to the axis of said shafts in the center of each planetry wheel and disc and extending through the flywheel, a lever for each slidable member oscillatably mounted on the flywheel and operatively connected to said slidable member, an internal gear on each of said planetary wheels, a clutch mechanism coacting with each planetary wheel and including an extensible pinion disposed in the center of the planetary wheel, planetary wheels guided by their periphery within the confines of said disc carrying the crank pin and adapted to connect the extensible pinion to said internal gear.

4. A progressive change speed gear comprising coaxial driving and driven shafts, a plurality of planetary members mounted for rotation with the driving shaft, a sun wheel fixed on the driven shaft, each planetary member including a planetary gear meshing with said sun wheel, a rotatable ring provided with an annular groove and adapted to be moved transversely to the axis of said two shafts to impart eccentricity to said groove, a control member operatively connected to said rotatable ring to change the amount of eccentricity of said groove, each planetary member being provided with a crank pin rotatable about the axis of the planetary gear and engaging in said annular groove whereby an oscillatory movement is imparted to said crank pins when said groove is eccentric and the driving shaft is rotated, a clutch provided for each planetary member to lock said crank pin to the planetary gear, a cam member successively operating the clutches of all the plantary members during one revolution of the driving shaft, means for operatively connecting said cam member to said control member to vary the angular position of the cam member relative to said clutches in accordance with the variations of eccentricity of said annular groove, cam means for simultaneously actuating the clutches of all the planetary members, and means for operatively connecting said cam means to said control member to bring said cam means into operative position upon said annular groove being centered.

In testimony whereof I affix my signature.

CHARLES EDOUARD HENRIOD.